United States Patent
Meijer et al.

(10) Patent No.: US 8,120,410 B2
(45) Date of Patent: Feb. 21, 2012

(54) ADAPTIVE CONTROL OF POWER SUPPLY FOR INTEGRATED CIRCUITS

(75) Inventors: Rinze Ida Mechtildis Peter Meijer, Herkenbosch (NL); Francesco Pessolano, Veldhoven (NL); Jose De Jesus Pineda De Gyvez, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 646 days.

(21) Appl. No.: 11/629,768

(22) PCT Filed: Jun. 9, 2005

(86) PCT No.: PCT/IB2005/051892
§ 371 (c)(1),
(2), (4) Date: Oct. 30, 2008

(87) PCT Pub. No.: WO2005/125012
PCT Pub. Date: Dec. 29, 2005

(65) Prior Publication Data
US 2011/0095803 A1    Apr. 28, 2011

(30) Foreign Application Priority Data
Jun. 15, 2004 (EP) .................................... 04102706

(51) Int. Cl.
*G05F 1/10* (2006.01)
(52) U.S. Cl. ........................ 327/534; 327/540
(58) Field of Classification Search ............ 327/530, 327/534, 535, 540, 541
See application file for complete search history.

(56) References Cited

U.S. PATENT DOCUMENTS

| | | | |
|---|---|---|---|
| 5,332,929 A | 7/1994 | Chiang | |
| 5,585,754 A | 12/1996 | Yamashina et al. | |
| 5,973,552 A | 10/1999 | Allan | |
| 6,031,778 A * | 2/2000 | Makino et al. | 365/226 |
| 6,107,836 A | 8/2000 | Kawahara et al. | |
| 6,337,593 B1 * | 1/2002 | Mizuno et al. | 327/534 |
| 6,373,321 B1 * | 4/2002 | Yamauchi et al. | 327/534 |
| 6,380,798 B1 * | 4/2002 | Mizuno et al. | 327/534 |
| 6,643,208 B2 | 11/2003 | Yamagata et al. | |
| 6,646,472 B1 | 11/2003 | Bobba et al. | |
| 6,836,179 B2 * | 12/2004 | Mizuno et al. | 327/544 |
| 7,612,604 B2 * | 11/2009 | Miyazaki et al. | 327/534 |
| 2003/0102904 A1 | 6/2003 | Mizuno et al. | |

FOREIGN PATENT DOCUMENTS

| | | |
|---|---|---|
| JP | 58 171842 | 10/1983 |
| JP | 5347550 A | 12/1993 |
| JP | 2000 165209 | 6/2000 |
| JP | 2001345693 | 12/2001 |

OTHER PUBLICATIONS

International Search Report dated Aug. 24, 2005 in connection with International Patent Application No. PCT/IB2005/051892.
Written Opinion of the International Searching Authority dated Aug. 24, 2005 in connection with International Patent Application No. PCT/IB2005/051892.

* cited by examiner

*Primary Examiner* — Jeffrey Zweizig (57) ABSTRACT

The present invention relates to a circuit arrangement and method for controlling power supply in an integrated circuit wherein at least one working parameter of at least one electrically isolated circuit region (10) is monitored, and the conductivity of a variable resistor means is locally controlled so as to individually adjust power supply for each of said at least two electrically isolated circuit regions (10) based on the at least one monitored working parameter. Thereby, a fast and simple control functionality with low area overhead can be provided.

21 Claims, 7 Drawing Sheets

ADAPTIVE CONTROL OF POWER SUPPLY FOR INTEGRATED CIRCUITS

The present invention relates to a circuit arrangement and method for controlling power supply in an integrated circuit (IC). In particular, the invention relates to integrated circuits which are subdivided into electrically isolated islands, where parameters such as supply voltage, clock frequency etc. of each island can be controlled individually.

Power efficiency is becoming a major issue as circuit technology is scaling towards smaller feature sizes. For high-performance applications, a scaled technology provides higher operating frequencies and a higher level of integration as long as the power limitations of package and cooling parts are not exceeded. The requirements for portable applications are even more stringent, because battery life depends on the energy consumption. Despite advances in battery technology, the demand for low-cost and small form-factor devices has kept the available energy supply roughly constant by driving down battery size. Low-power and low-voltage designs will be important for the further progress in Ultra Large Scale Integration (ULSI) designs.

Lowering the power supply voltage provides significant power savings. However, it can be observed that circuit delay increases for decreasing power supply voltages, which may lower the chips operating frequency resulting in a degradation of the circuit performance. Thus, there is a trade-off between circuit performance and power reduction.

Basically, two ways of lowering the power supply voltage without compromising system performance have been suggested. One common technique is to determine the optimal, e.g. lowest, power supply voltage during the design phase of the IC. When this is done for a whole IC, the lower energy consumption will be at the cost of increasing gate delays, as indicated above, which leads to reduced system performance. If this performance reduction is not desired, the IC can be partitioned into different functional regions of which each region is powered by its own dedicated supply voltage, so-called 'islands-of-voltage'. Since the performance requirements of non-critical regions of the IC are lower than those of the critical ones, their supply voltage can be lowered in order to save power without deteriorating system performance. The optimal or lowest supply voltage of the non-critical regions is determined during the design phase, while the critical regions are powered off the nominal supply voltage. The other technique is dynamic supply scaling which can decrease the systems average energy consumption during operation without sacrificing the system performance. By dynamically varying both the operating frequency and the power supply voltage in response to workload demands, a processing unit always operates at just the desired performance level while consuming the minimal amount of energy. During reduced workload periods, dynamic supply scaling lowers the supply voltage to slow down computation instead of working at a fixed high voltage and allowing the processing unit to idle. Both of the described techniques can also be combined in case the IC is partitioned into different functional regions.

In 'Managing power and performance for system-on-chip designs using Voltage Islands', Lackey et al., Proc. of ICCAD 202, San Jose, USA, 10-14 Nov. 2002, pages 195-202, a system architecture called "voltage islands" is proposed to reduce power consumption of System-on-Chip (SoC) designs. The voltage islands methodology allows designers to independently optimize functional blocks of the SoC design to run at their optimal supply voltage. Therefore, each functional block can have power characteristics unique from the rest of the design. However, voltage islands require additional circuitry to handle differences in both magnitude and timing that can occur between internal supply voltages (island voltages) and external supply voltages at island boundaries. Voltage island receivers perform this function for signals going from the parent block into the island, while voltage island driver cells perform the equivalent function from the island to the parent block. These drivers and receivers must provide reliable voltage level shifting for a wide range of operating voltages, and do so with minimum impact on signal delay or duty cycle.

Furthermore, adaptive voltage supply has been proposed to be used for different functional regions on a single chip. In this way, the supply voltage of those regions can be optimized individually, and thereby allowing further performance optimization. As an example, Nowka et al. describe in 'A 32-bit PowerPC system-on-a-chip with support for dynamic voltage scaling and dynamic frequency scaling', IEEE Journal of Solid-State Circuits, November 2002, Vol. 37, No. 11, pages 1441-1447 a system-on-a-chip processor which makes use of dynamic voltage scaling and on-the-fly frequency scaling to adapt to the dynamically changing performance demands. The SoC makes use of active power reduction techniques to dynamically match the power consumption with the requirements of the application. Active power consumption is reduced when resources demands are low through the use of dynamic voltage scaling, dynamic frequency scaling, unit and register level functional clock gating. To support dynamic voltage scaling in this SoC, the power distribution has been divided into four distinct power domains of which two domains are voltage controlled.

Additionally, Miyazaki et al. describe an autonomous and decentralize system in 'An autonomous decentralized low-power system with adaptive-universal control for a chip multi-processor', IEEE International Solid State Circuits Conference, Digest of Technical Papers, San Francisco, USA, 8-13 Feb. 2003, pages 108-109, where each processor can operate at a minimum power consumption while maintaining specified performance. The power supply and clock are supplied to each module by global-routing lines, and each module is equipped which a voltage regulator and clock divider. A self-instructed look-up table in each module determines the voltages and frequency applied to the respective module. A compound built-in self test unit measures the performance of each module during the initial chip-testing phase and sends the data to each look-up table for memorization and use.

However, the above decentralized systems require sophisticated adaptation and power conversion circuits which increase area overhead and processing requirements.

It is therefore an object of the present invention to provide a simple adaptive control scheme with low area overhead for independent control of power supply to electrically isolated islands of an integrated circuit.

This object is achieved by a circuit arrangement as claimed in claim 1 and by a control method as claimed in claim 21.

Accordingly, a very simple autonomous scheme for power control is provided where the controlled supply voltage can be varied in a wide range as a function of different parameters like workload, required circuit performance of the electrically isolated circuit regions or the like. The use of variable resistor means for adjusting the individual power supply provides the advantage of low area overhead compared to the known solutions which require DC-DC converters and other dedicated circuits, and enables simple digital control and fast transient response. Furthermore, no additional external components are required as in the case of DC-DC converters. Basically, the suggested control system senses the island's activity and operational conditions and correspondingly adapts the variable resistor means to compensate for the resistance variation of the island, i.e., isolated circuit region.

The variable resistor means may comprise transistor means connected in series between the isolated circuit regions and at least one power supply terminal. The transistor means add additional resistance between the isolated circuit regions and their supply lines, while the power supply voltage can be controlled by changing the series resistance value introduced by the transistor means. Thereby, no changes are required in the global power network of the whole integrated circuit. In particular, the transistor means may comprise a first transistor connected between a first power supply input of a dedicated one of the isolated circuit regions and a first one of the power supply terminals, and a second transistor connected between a second power supply input of the dedicated one of the isolated circuit regions and a second one of the power supply terminals, wherein the local control means may be arranged to supply a first control signal to the first transistor and a second control signal to the second transistor, and wherein the first control signal may be an inversion of the second control signal. Each of the isolated circuit regions can thus be put into a standby mode when both first and second transistors are switched off to thereby reduce the circuit's power consumption to a minimum value.

The transistor means may be divided into a plurality of transistor segments each segment or subset of segments being connected to a bit of a dedicated control register which is set by the local control means. A discrete digital control of the resistance value can thus be introduced, wherein the control register can be easily programmed or reprogrammed at runtime to enable adaptive supply voltage control.

The local control means may comprise a first control function for compensating average voltage fluctuations, and a second control function for compensating voltage fluctuations due to activity changes of a dedicated one of the at least two electrically isolated circuit regions. Thereby, a slow control function can be provided for compensating environmental or chip-specific variations, while a fast control function can be provided for compensating variations in the processing load. The first control function may be used for controlling a clock frequency of the dedicated one of the at least two electrically isolated circuit regions. Thus, the first control function can be used to correct the power supply voltage for a desired clock frequency.

The first and second control functions may be adapted to set control values into respective first and second shift register means, said first and second shift register means being used to control the variable resistor means. An arbitration means may then be provided for selectively connecting the first and second control functions to the first and second shift register means. By using the arbitration means, an operation of both control functions at the same time can be prevented. As an alternative decoder means may be used to control the variable resistor means in response to the control values.

Furthermore, a look-up table may be provided for storing a desired value for the first control function. By storing value pairs of the operating frequency and a voltage code word in the look-up table, the first control function can be set in accordance with a desired performance.

The local control means may be arranged to control the conductivity by performing at least one of changing the voltage level of the control signal, and switching the control signal. Thereby, different individual degrees of conduction can be achieved based on the type of change operation. Moreover, the control signal may be used to dynamically change an element size of the variable resistor means.

The adjusted power supply may be forwarded to a clock generating means to individually adjust a clock supplied to the at least one electrically isolated circuit regions. In addition to the at least one electrically isolated circuit region the circuit may have one or more uncontrolled circuit region, e.g. a circuit region for the CGU. The clock generating means can thus be placed in the autonomous island whose power supply is controlled by the local control means.

Additionally, the local control means may be arranged to control a back-bias voltage of transistor elements provided in the at least two isolated circuit regions. Thereby, performance of the isolated circuit regions can be individually controlled by properly biasing the bulk terminal of the transistors to change their threshold voltage.

Furthermore, the local control means may be arranged to control a bypass means to skip at least one register means of a processing pipeline of the at least two isolated circuit regions. Thus, another or additional method of controlling the performance of the isolated circuit regions can be provided to achieve an efficient configuration.

Furthermore, shift register means may be provided which can be connected to the variable resistor means and to a clock generator means for supplying an adjusted clock signal to the isolated circuit regions, wherein the shift register means may be controlled based on a binary control signal supplied from the local control means, and wherein the binary control signal defines at least one binary value shifted into the shift register means so as to either increase or decrease the performance of the isolated circuit region. This solution provides the advantage that performance of the isolated circuit regions can be easily controlled based on at last one simple binary control scheme or signal. In particular, the bit values of the shift register means may be used to individually bypass delay sections of the clock generator means. The frequency of the clock generator means can thus be directly controlled based on the bit values shifted into the shift register means.

As another option, the local control means may be arranged to select a predetermined profile mode from a plurality of profile modes, each profile mode defining a predetermined relationship between a set of performance parameters of the isolated circuit region. Thus, the selected profile mode ensures that physical variables or performance parameters are modified continuously so as to meet the specified performance. In particular, specific ones of the parameters can be tied to other parameters, to thereby provide a coupling between individual parameters. In particular, the performance parameters may comprise a clock frequency, a power supply voltage and a threshold voltage. The predetermined profile mode and the performance parameters may be stored in a look-up table. Furthermore, the plurality of profile modes may comprise a profile mode in which the power supply voltage and the clock frequency are maintained at a fixed relationship.

Further advantageous modifications are defined in the dependent claims.

In the following, the present invention will be described on the basis of preferred embodiments with reference to the accompanying drawings in which.

The preferred embodiments will now be described on the basis of an IC which is partitioned into different islands. Each island can be contained in an isolated third well of a triple well CMOS (Complementary Metal Oxide Semiconductor) technology. Triple well CMOS technology allows a well of a first type, e.g. a P-well, to be placed inside a well of a second type, e.g. an N-well, resulting in three kinds of well structures: simple wells of the first type, simple wells of the second type, and wells of a third type, consisting of a well of the first type inside a deep well of the second type. The third type of well is useful for isolating circuitry within it from other sections on the chip by a reverse bias between the deep well of the second type and the substrate. Each well can be controlled and its working conditions can be modified depending on some parameters. The remainder of the chip can be controlled as well, depending on other parameters. Each island is operating at one or more utility values, and at least one utility value of a first island can be different from a corresponding utility value of a second island.

Figure 1:
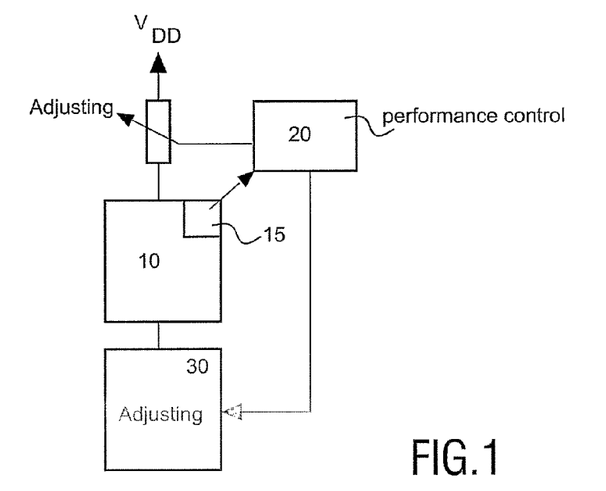
FIG. 1 shows a schematic block diagram of an island with variable resistor means and control circuitry according to the preferred embodiments.

FIG. 1 shows a schematic circuit diagram of a control scheme according to the preferred embodiments, where an CMOS circuit 10 provided on an island is connected via resistor circuits or resistor means to power supply voltage terminals, i.e. a reference voltage terminal, e.g. ground terminal GND or terminal $V_{SS}$, and a supply voltage terminal $V_{DD}$. The integrated circuit may be provided with a monitoring function or unit 15 for monitoring at least one working parameter related to a working condition of the integrated circuit, and at least one island of the IC are provided with a local control device 20 for independently tuning or controlling at least one utility value for at least one island, based on the monitored at least one working parameter.

The one or more utility values may comprise one or more of supply power, transistor threshold voltage, transistor back-bias or clock frequency. The transistor threshold voltage may be determined by a bulk voltage of some transistors in a computational island, e.g. the transistors of the processing core or module. The at least one working parameter related to a global working condition of the integrated circuit may comprise at least one of circuit activity, circuit delay, power supply noise, logic noise margin values, threshold voltage value or clock frequency value. A pre-set level of performance may relate to any or all of power consumption or speed of the integrated circuit.

According to the preferred embodiments, the variable resistor means act as an actuator provided to control the power supply voltage of the CMOS circuit 10 provided on the island. The control supply voltage can vary in a wide range between ~Vth and $V_{DD}$ Volts as a function of the different performance parameters like workload or required circuit performance. The proposed supply voltage actuator offers many advantages when it is used in SoC applications, such as adaptive control of the active power and energy consumption, adaptive control of leakage current, low area overhead when compared to DC-DC converters, simple digital control, and fast transient response. Furthermore, no additional external components, such as inductivities L or capacities C, are required as in case of DC-DC converters.

The supply voltage actuator may be implemented as the above variable resistor which is controlled by the local control device or unit 20, which is explained later in more detail. The variable resistor may be implemented based on any semiconductor circuit or other circuit having a controllable resistor functionality or acting as a controllable resistance.

According to the first preferred embodiment, the actuator is implemented as a PMOS transistor M2 and an NMOS transistor M1, which are connected in series with the CMOS circuit 10 of the island. These transistors M1 and M2 add additional resistance between the CMOS circuit 10 and its supply lines. For example, a low resistance value is required to minimize the voltage drop when the circuit requires its maximum operating speed. The power supply voltage of the CMOS circuit 10, i.e. $V_{DD}-\Delta V$, can be controlled by changing the series resistance value introduced by the transistors M1 and M2. In this way, no changes have to be made to the global network in case the chip or IC consists of multiple islands.

Figure 2:
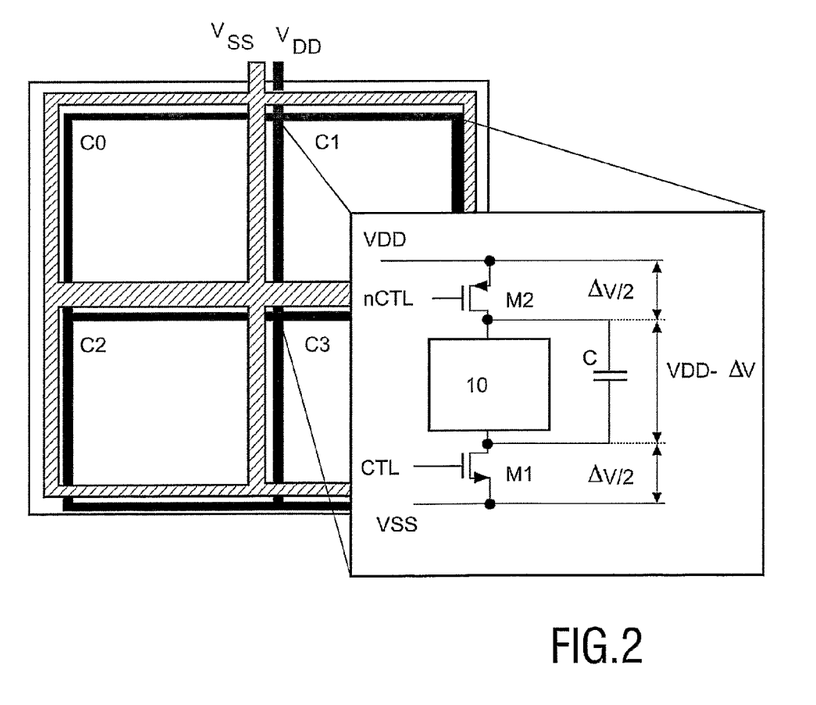
FIG. 2 shows an example of a multi-core chip design in which the preferred embodiment scan be implemented.

FIG. 2 shows a schematic circuit diagram in which a header transistor M2 and a footer transistor M1 are used. The state of the header transistor M2 is controlled by a control signal nCTL, while the state of the footer transistor M1 is controlled by a control signal CTL. The signal CTL is an inversion of the signal nCTL, wherein the voltage $V_{nCTL}$ of the signal CTL can be obtained from the voltage $V_{CTL}$ of the signal nCTL based on the equation $V_{nCTL}=V_{DD}-V_{CTL}$. In this case, the CMOS circuit 10 can be put in a standby mode when both the header transistor M2 and the footer transistor M1 are switched off ($V_{nCTL}=V_{DD}$ and $V_{CTL}=0$), so that the circuit's power consumption is reduced to a minimum value. In the active mode, of the CMOS circuit 10 both series transistors are conducting. Different degrees of conduction can be achieved by at least one of changing the voltage levels of the control signals nCTL and CTL, applying a switching nCTL and CTL signal, and sizing the geometry of the series transistors M1 and M2 dynamically. These control functions are initiated by the local control unit 20.

As can be gathered from FIG. 2, the integrated circuit is arranged as a multi-core chip design comprising four cores C0 to C3 to which power supply voltages $V_{SS}$ and $V_{DD}$ are applied via respective wiring systems. A capacitor C in FIG. 2 represents the internal capacitance of the non-switching parts of the circuit and the internal decoupling capacitance. Since the capacitor C supplies current peaks to the circuit 10, the current flowing through both series transistors M1 and M2 mainly corresponds to the average current consumed by the circuit 10, and the voltage drop $\Delta V$ at both series transistors M1 and M2 will remain approximately constant.

The isolation of the different island voltage supplies thus can be achieved by the supply voltage actuator consisting of the two transistors M1 and M2 in the first preferred embodiment. The concept of voltage islands can easily be merged with a globally-asynchronous-locally-synchronous (GALS) solution, in which individual islands are operated in a synchronous manner, while the overall integrated circuit is operated in an asynchronous manner. The independent clock of an island can be adjusted by the supply voltage actuator as a function of different parameters such as workload or circuit performance, i.e., the clock unit can be bound to the power supply of the island. However, it should be verified that the clock frequency fits to the island's speed by properly adjusting the power supply. This action, which could take place simultaneously for various islands, can easily be accomplished with the proposed supply voltage actuator.

Figure 3:
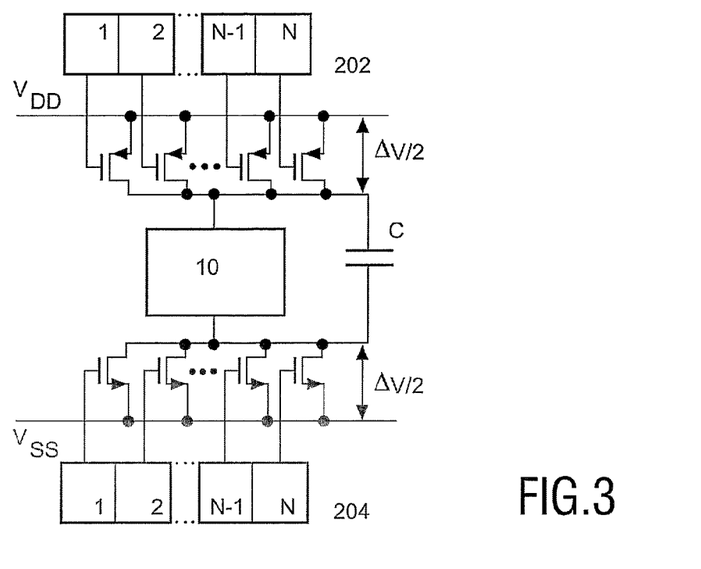
FIG. 3 shows a schematic circuit diagram of segmented series transistors according to a first preferred embodiment.

FIG. 3 shows a specific example of the supply voltage actuator according to the first preferred embodiment, where the series transistors M1 and M2 are divided into N segments. Each transistor segment or a subset of segments can be controlled by a bit from respective dedicated control registers 202, 204. Thereby, a discrete control of the resistance value can be introduced by the segmented series transistors M1 and M2.

According to FIG. 3, a segment is conducting when the corresponding control bit of the respective control register is at high level, and a segment is not conducting when the control bit is at low level in case of the N-MOS footer transistor. On the other hand, in case of the PMOS header transistor, a segment is conducting when the corresponding control bit is at low level, while the segment is not conducting when the control bit is at high level. The control registers 202 and 204 can be easily programmed or reprogrammed at runtime, thus enabling adaptive supply voltage control. The number of segments, their geometry and the size of the control registers 202, 204 determine the resolution or step size and the range of supply voltage control. Furthermore, the size of the non-switching circuit capacitance C needs to be well-sized in order to cope with the voltage fluctuations of ΔV at the header and footer transistor segments.

It is obvious that the same control function shown in FIG. 3 alternatively can be implemented by a single control register with its output connected to one segmented transistor and the inverted output connected to the other segmented transistor.

The control values set into the control registers 202, 204 are supplied by the local control unit 20. This kind of online correction may consist of two control functions, namely a μ-control which compensates for average voltage fluctuations and a track-control which acts on local voltage changes. The μ-control compensates cold-start offsets due to process variability or other environmental or chip-specific influences. For instance, if the island is in a fast process corner then it is possible that a slightly lower supply voltage may be sufficient to reach its target operating frequency. This power supply offset compensation can be based on actual on-chip silicon measurements. Due to the variability of the fabrication process, every chip in a wafer is different from the others. Typically, a wafer is divided into various regions yielding slow, nominal and fast transistors. Conventional design methodologies make use of worst-case conditions, i.e. slow transistors, to carry out the design.

The μ-control is periodically performed to take into account operational drifts due to, for instance, temperature gradients. On the other hand, the track-control compensates voltage fluctuations due to activity changes as a result of more or less processing operations of input stream data in the CMOS circuit 10. The mean value is adjusted over longer periods of time while the standard deviation can be done on a cycle-to-cycle basis.

Figure 4:
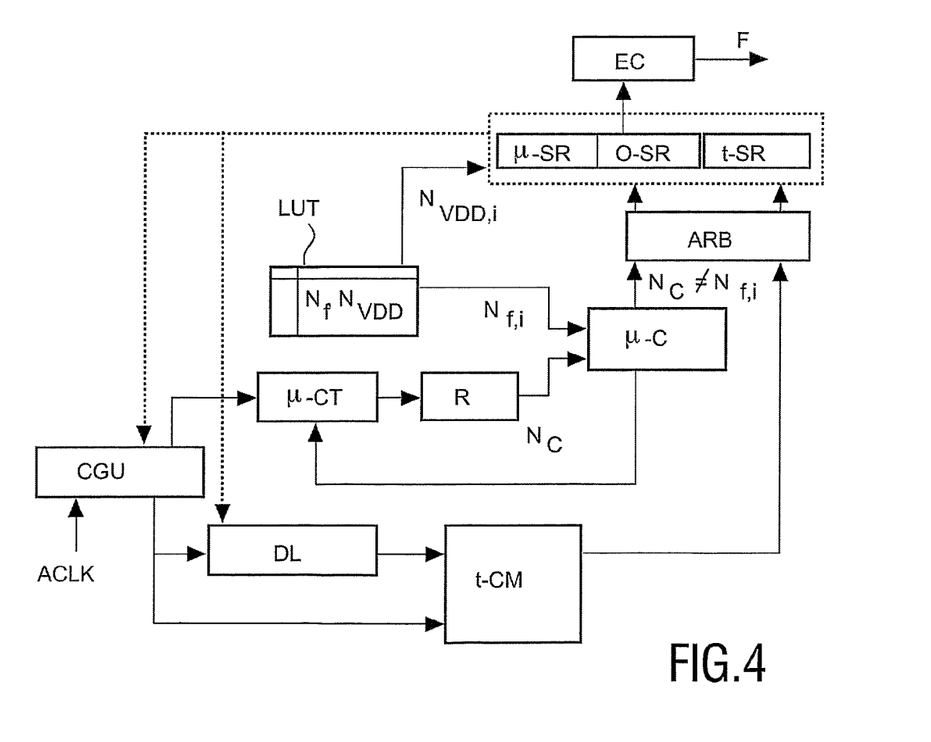
FIG. 4 shows a schematic block diagram of a local control circuit according to the first preferred embodiment.

FIG. 4 shows a block diagram of an online correction stage as provided in the local control unit 20. This circuit requires prior knowledge of the absolute clock frequency, the number of counts $N_{f,i}$ to be generated by a clock generating unit CGU for each frequency value, as well as the number of ones or zeros $N_{VDD,i}$ required to setup a μ-shift register μ-SR used for controlling the conductance of a variable resistor. These preset values can be stored at the design stage of the integrated circuit. In fact, the number of counts $N_{f,i}$ is a digital representation of the operating frequency of the circuit. Each value of $N_{f,i}$ is tied to a unique $N_{VDD,i}$ value, which results in a set of ($N_{f,i}$, $N_{VDD,i}$) pairs which may be stored in a corresponding look-up table LUT.

The clock generating unit CGU is placed in an autonomous island whose power supply is controlled by the μ-shift register μ-SR and an O-shift register O-SR. Furthermore, the controlled CMOS circuit 10 can be placed in a different autonomous island whose power supply is controlled by the μ-shift register μ-SR, the O-shift register O-SR and a track shift register t-SR. Thereby, it is prevented that the power supply of the clock generating unit CGU is influenced by the σ-control function.

The adaptive control procedure of the power supply can be performed as follows. The user or, e.g. a power-management unit (not shown) provides the performance requirement by means of selecting the desired frequency represented by the number of counts $N_{f,i}$. The μ-shift register μ-SR is loaded with the $N_{VDD,i}$ which is necessary to have the clock generating unit CGU operated at the desired frequency $f_i$. The clock generator may comprise any suitable clock generating circuit, e.g. based on a phase-locked loop (PLL) or any other oscillator circuit. A μ-counter μ-CT is adapted to count the number of pulses generated by the clock generating unit CGU during a predetermined time period, and thereby translating its oscillation frequency into a digital representation. After the count period as elapsed, the content $N_C$ of the μ-counter μ-CT is loaded into a register R and compared to the desired number of counts $N_{f,i}$ in a μ-comparator μ-C. If it is determined at the μ-comparator μ-C that $N_{f,i}$ is larger than $N_C$, this means that the silicon of the circuit is slower and as such the power supply voltage must be increased to equalize the counts. On the other hand, if it is detected that $N_{f,i}$ is smaller than $N_C$, the power supply voltage must be decreased to equalize the counts. This is done by changing the content of the O-shift register O-SR.

A reset signal is supplied to the μ-counter μ-CT by the μ-comparator μ-C after every comparison. The clock generating unit CGU is enabled at the positive edge of an absolute clock reference ACLK supplied thereto. This clock reference ACLK can be much slower than the maximum frequency of the circuit under control resulting in a binary μ-counter μ-CT and holding μ-register R of 10 bits, for example.

Additionally, to compensate for changes due to local activity of the CMOS circuit 10, a second and faster control function is provided. This second control function is called track-control or track-loop. The track-control operates as follows. The output of the clock generating unit CGU is compared with its delayed version obtained from a delay line or delay unit DL in a phase-frequency-detector (PFD) unit t-CM. The delay unit DL can be a replica of the critical path of the CMOS circuit 10 with a possible safety margin delay. The delay unit DL is embedded in the CMOS circuit 10 to be controlled. If the PFD unit or track comparator t-CM detects that the original signal supplied from the clock generating unit CGU are not in synchronization, then the track shift register t-SR is adjusted by changing its contents. If the delayed signal has a delay lower than one clock cycle, the power supply voltage must be reduced. On the other hand, if the delayed signal has a delay higher than one clock period, the power supply voltage must be increased. The desired power supply voltage is found if the original and delayed signals are synchronized.

Furthermore, an arbitration unit ARB is provided to prevent both loops from operating at the same time. In particular, the arbitration unit ARB performs control to select which of the two control functions, i.e. the slow control function or the fast control function, updates its shift register when both control functions intend to update their shift register at the same time. Thereby, conflicts between the control signals can be prevented by giving one control function a higher priority, e.g., the μ-control.

Due to the fact that the clock generating unit CGU is provided on a different island, it is not affected by the activity fluctuations of the controlled CMOS circuit 10. However, both the clock generating unit CGU and the controlled CMOS circuit 10 share the same control signals for the μ-shift register μ-SR and the O-shift registers O-SR, while the additional control signals of the track shift register t-SR are supplied to the controlled CMOS circuit 10 only. Consequently, both have different transistor segments between their controlled power supply and the common power supply, which means that their controlled power supplies are not shared. The control shift registers 202, 204 of FIG. 3 can thus be basically divided into several sections, e.g. three sections which correspond to the μ-shift register μ-SR, the O-shift register O-SR and the track shift register t-SR. The μ-shift register μ-SR and the O-shift register O-SR relate to the μ-control function, while the track shift register t-SR relates to the track-control function.

The digital code word of the μ-shift register μ-SR is set by the desired performance, i.e. $N_{VDD,i}$. The update of the μ-shift register μ-SR is done using an open-loop approach, i.e. no feedback control. However, operational drifts, temperature or process variations cause problems when working in an open-loop control only. Therefore, the O-shift register O-SR is additionally used to compensate for these operational drifts. The corresponding slow loop of the μ-control function builds a feedback control system to adapt the conductivity of the series transistors to these variations and/or drifts. Furthermore, in case of any activity fluctuations which happen on a cycle basis, the track shift register t-SR tracks the activity fluctuations and corrects properly using a feedback control.

In view of the fact that the control shift registers 202, 204 consist of a finite number of elements, they can control the resistance of the series transistors M1, M2 only within a certain range. If a resistance is required beyond this range, an error flag can be enabled. This can be interpreted as an overflow or underflow of the control shift registers 202, 204.

In summary, the clock generating unit CGU is tied to its own controlled $V_{DDC}$, while the controlled CMOS circuit 10 is controlled by all control functions and receives a clock frequency generated by the clock generating unit CGU.

Figure 5:
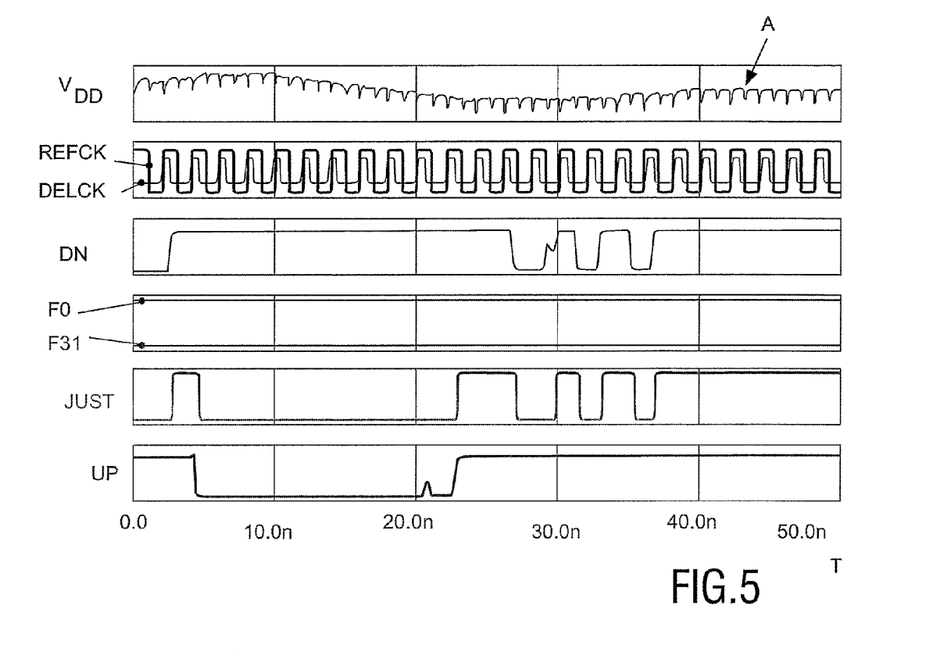
FIG. 5 shows a signaling diagram indicating examples of waveforms of signals relating to a control loop according to the first preferred embodiment.

FIG. 5 shows signaling diagrams with waveforms relating to the track-control function, wherein the signals from the top to the bottom relate to the controlled power supply voltage $V_{DD}$, the (reference) clock frequency REFCK of the clock generating unit CGU, the delayed clock version DELCK, a control signal DN indicating if the power supply voltage should be reduced, a least significant bit value F0 of the binary control word for the footer transistor M1, a most significant bit value F31 of the binary control word of the footer transistor M1, a control signal JUST indicating if the power supply voltage should be kept constant, and a control signal UP indicating if the power supply voltage should be increased. The initial value of the controlled power supply voltage $V_{DD}$ can be set by the μ-control function based on the information obtained from the look-up table LUT. Then, the track-control function adjust the power supply voltage to the desired value as indicated by the arrow A. The control signal JUST is set to '1' over the power supply voltage $V_{DD}$ reaches its desired value. As can be gathered from FIG. 5, the LSB F0 is continuously set to high level '1', while the MSP is continuously set to low level '0'.

In the following, a second preferred embodiment is described, where the local control unit 20 is adapted to change the pipeline depth of at least one processing function provided in the controlled CMOS circuit 10.

Modern processors use pipelines to serialize and optimize the instruction execution to improve their performance. However, it is well known, that the optimal pipeline depth depends on a running application or even its current section. Therefore, it is proposed to allow the local control unit 20 to modify the pipeline depth of a processing stage or function of the controlled CMOS circuit 10 by means of merging or skipping some pipeline stages, which will also result in the necessity to alter the operating or clock frequency. Hence, the pipeline depth can be chosen individually for each island to optimize performance, e.g. multimedia applications require a maximum pipeline depth, while real-time applications might use an intermediate pipeline depth, etc. Any pipeline would benefit from this approach, while, however a balanced pipeline where the logic between two register banks have similar delays would benefit the most.

Figure 6:
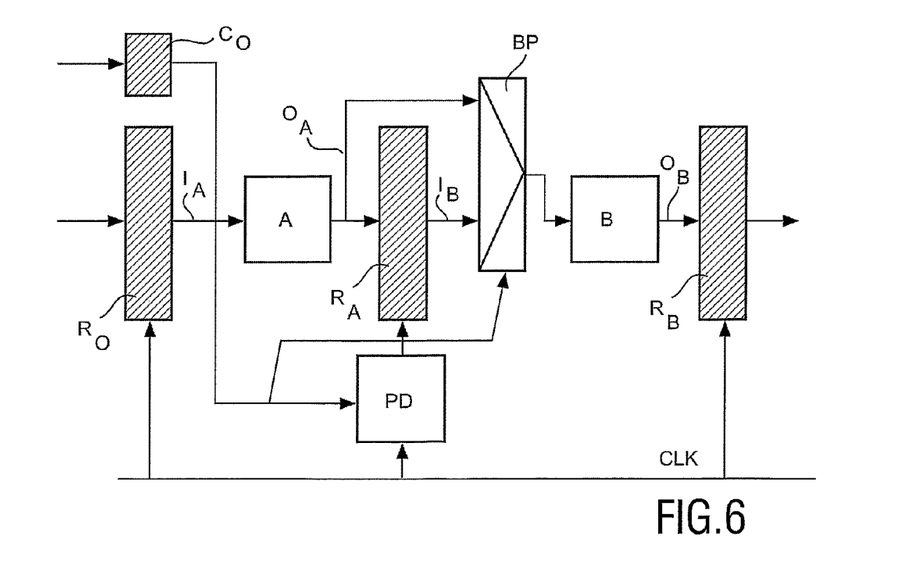
FIG. 6 shows a schematic block diagram indicating a variable-depth pipeline configuration according to a second preferred embodiment.

FIG. 6 shows a variable-depth pipeline according to the second preferred embodiment where two operations A and B are performed in respective processing or logical units. If an intermediate register $R_A$ can be skipped, the operations A, B can be executed in one clock cycle and the pipeline depth could be effectively changed to 2. To achieve this, an extra logic PD (Pipeline Disable) is added, which allows to gate the clock of the intermediate register $R_A$. Furthermore, a bypass unit BP, which may be a multiplexer or other selective switching circuit, is added to select the appropriate input to the logic or operation B. By adding these structures to every register barrier, the pipeline depth can be altered completely.

There can be many ways by which an application or the local control unit 20 could try and change the pipeline depth. One way is to specify a pipeline profile which defines which register barrier should be skipped and the necessary operating frequency to be set by the above μ-control function. The enabling and disabling of the pipeline stage may as well be based on corresponding instructions of a software routine.

In example shown in FIG. 6, the pipeline comprises the operation A followed by the register $R_A$ and the operation B followed by a register $R_B$. While the operation A computes the output value $O_A$ based on the input value $I_A$, the operation B computes the output value $O_B$ based on the input value $I_B$. The input value $I_B$ is the outcome of the operation A in the previous clock cycle.

A disadvantage of the pipelined operation is that latency increases. The clock period T supplied to the pipeline has to be adapted to the longest delay time occurring in the chain. Thus, the latency with which the output value $O_B$ is available can be expressed as $T+\tau_B$, which is usually longer than $\tau_A+\tau_B$, wherein $\tau_A$ and $\tau_B$ are the latencies for the operations A and B, respectively.

In the second preferred embodiment, the local control unit 20 controls the bypass unit B to enable the skipping of one or more registers in the pipeline. Skipping a register can be advantageous if the operations in the pipeline only have to be performed incidentally. The control can be performed by setting a control value into a control latch or flipflop $C_0$, while the input value $I_A$ is supplied to an input register $R_0$. Thus, the latency can be shortened which has a relevant effect on the throughput of the pipeline. This throughput corresponds to the number of instructions which can be carried out in a certain time period. While skipping one or more register stages, the latency is reduced but the throughput is lowered, because a waiting time must be introduced until a new input value can be processed in both stages.

Next, a modified supply voltage actuator for combined control of clock frequency and supply voltage is described in connection with the third preferred embodiment. In particular, a modified actuator tuning function enables easy control of the performance of the controlled circuit 10 of FIG. 1.

When the performance demand is low, the power supply can be lowered, delivering reduced performance but with a substantial power reduction. For high performance demands, the highest supply voltage delivers the highest performance at the fastest designed frequency of operation. Furthermore, such an approach can be used for tracking process and temperature variations. All schemes which have so far implemented this approach are based on receiving one or more performance indicators, which normally correspond to the desired clock frequency and supply voltage provided to the controlled system. The intelligence behind the manipulation of electrical parameters like power supply and operating frequency are thus arranged externally from the controlled circuit 10.

The basic idea of the actuator according to the third preferred embodiment is to replace the philosophy of given performance indication by simply requesting for more or less performance. This can be accomplished with a binary signal, i.e. at most two bit values, and leads to a very simplified implementation based on a shift register or first-in-first-out (FIFO) memory, a variable resistor used to generate the controlled supply voltage for the controlled circuit 10, and a linearly programmable clock generator.

Figure 7:
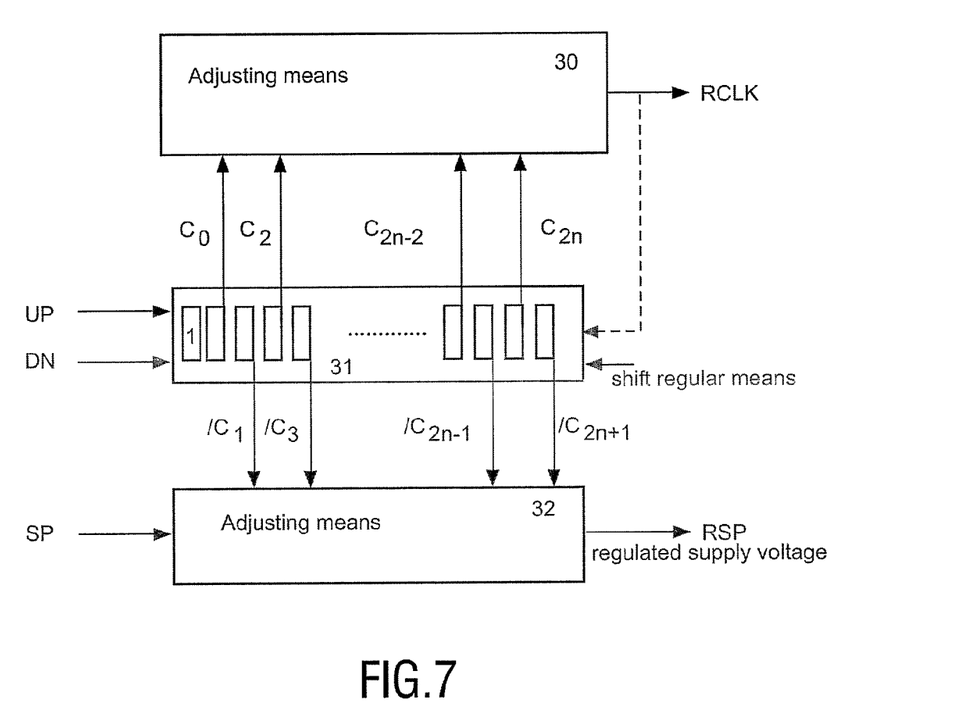
FIG. 7 shows a schematic block diagram of a control module for simultaneously controlling clock and power supply according to a third preferred embodiment.

FIG. 7 shows a generic implementation of this control scheme. Binary control signals UP and DN are provided by the local control unit 20 and indicate whether more or less performance is required. Both signals control the FIFO or shift register 31 and are used as push or pop signals. Alternatively, a single binary control signal could be used, which is supplied and split into a non-inverted and inverted version to obtain the UP and DN values.

The bits stored in the shift register 31 are sent to a variable resistor 32 and to a clock generator 30. In response thereto, the clock generator 30 generates a regulated clock RCLK, and the variable resistor 32 generates a regulated supply voltage RSP.

Figure 8:
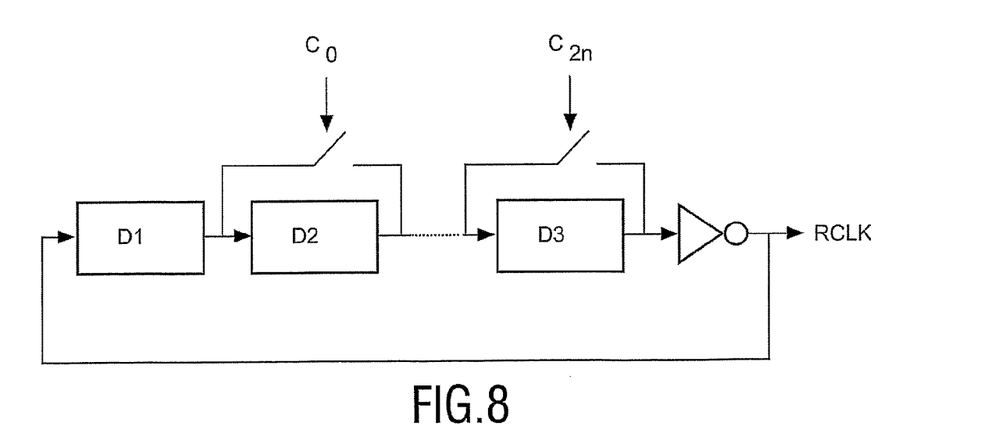
FIG. 8 shows a schematic circuit diagram of a linearly programmable clock generator according to the third preferred embodiment.

FIG. 8 shows a schematic circuit diagram of an example of the clock generator 30. According to FIG. 8, the clock generator 30 consists of a loop comprising an inverter and a plurality of delay sections D1 to D3 which can be bypassed based on control signals $C_0, C_2, \ldots, C_{2n}$, derived from the respective even bit positions of the shift register 31. Due to the fact that the total delay of the loop of the clock generator 30 determines the regulated clock frequency RCLK, the clock frequency can be controlled based on the bit values stored in the shift register 31.

Figure 9:
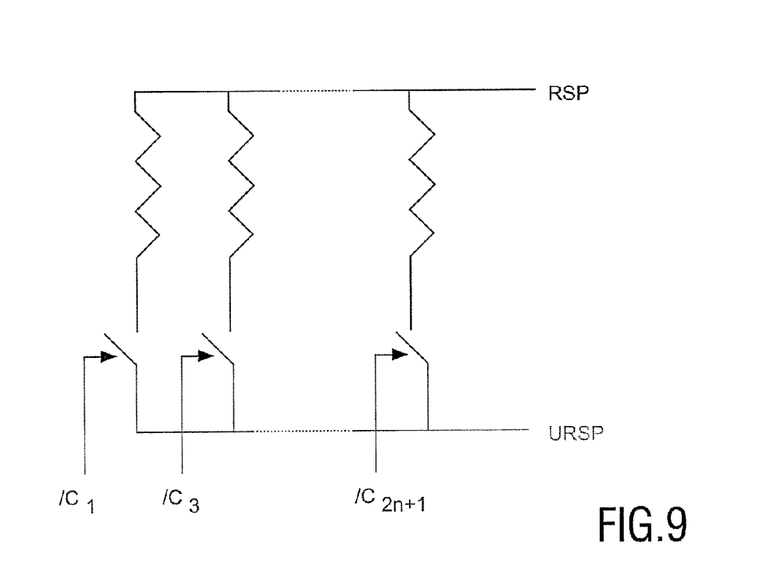
FIG. 9 shows a schematic circuit diagram of a controllable parallel variable resistor according to the third preferred embodiment.

FIG. 9 shows a schematic circuit diagram of an example of the variable resistor 32 connected between a regulated supply terminal RSP and an unregulated supply terminal URSP. The variable resistor 32 comprises a plurality of parallel resistor branches which can be individually switched based on control signals $/C_1, /C_3, \ldots, /C_{2n+1}$ obtained from an inversion or negation of the respective odd bit positions of the shift register 31. Of course, the controllable resistor circuit of FIG. 9 can be replaced by the transistor segments shown in FIG. 3, wherein the control signals are supplied to the control terminals of the transistor segments.

While increasing the number of logical '1' values in the pattern, the total delay of the clock generator 30 is increased (as the number of active delay sections is reduced in FIG. 8) and the total resistance of the variable resistor 32 is reduced (as the number of open resistor branches in FIG. 9 increases).

The control scheme works as follows:

Initially, the shift register 31 will have a logical '1' at its first bit position or slot and the remaining bit positions or slots are filled with logical '0', which results in a pattern '100 . . . 000'. This ensures that the variable resistor is at its minimum value (all resistor branches are connected or closed) and the clock generator provides the fastest clock corresponding to the lowest total delay (only one delay section D1 is active), which is however an arbitrary choice. When the local control unit 20 enables the control signal DN, the number of slots containing logical '1' is increased by shifting a logical '1' into the shift register 31 (shift to the right in FIG. 7) to obtain a pattern '110 . . . 000'. Depending on the new slot which is set by the shift operation, i.e. odd or even slot, either the supply voltage or the clock frequency is reduced. On the other hand, when the local control unit 20 enables the control signal UP, the number of slots containing '1' is decreased by removing a logical '1' from the shift register 31 (shift to the left in FIG. 7) to obtain the pattern '100 . . . 000'. Depending on which slot is reset, i.e. odd or even slot, either the supply voltage or the clock frequency is reduced.

The sequence of actions is such that the clock frequency is reduced always before the supply voltage and the supply voltage is always increased before the clock frequency. In the proposed control scheme, rising (and of course releasing) the control signals UP and DN causes only one change in the state of the shift register 31. It could be also possible to feed the shift register 31 with the generated clock RCLK, as indicated by the dotted line in FIG. 7, so that a plurality of slots are set or reset as long as the control signal UP or DN is kept high.

The controlled circuit 10 operates at its maximum performance when the shift register 31 is filled only with logical '0', while largest power savings are obtained in case the shift register 31 is filled only with logical '1'. Since the local control unit 20 controls the clock generator 30, it knows a clock frequency or operating frequency for a given data word of the shift register 31. On the other hand, a performance monitor, e.g. a ring oscillator and a counter, can be used to perform real-time measurements of the performance of the controlled circuit 10.

Figure 10:
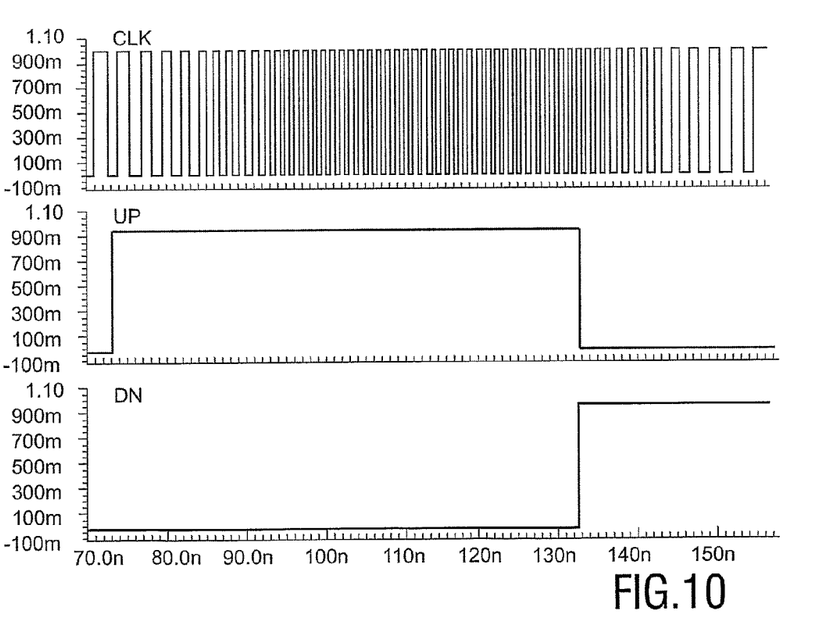
FIG. 10 shows a signaling diagram indicating an example of a clock waveform used in the third preferred embodiment.

FIG. 10 shows signal diagrams indicating, from the top to the bottom, waveforms of the regulated clock signal RCLK, the control signal UP and the control signal DN. As can be gathered from FIG. 10, the regulated clock signal RCLK increases in frequency when the control signal UP is on a high logical state, while the regulated clock signal RCLK decreases in frequency, when the control signal DN is in a high logical state.

Figure 11:
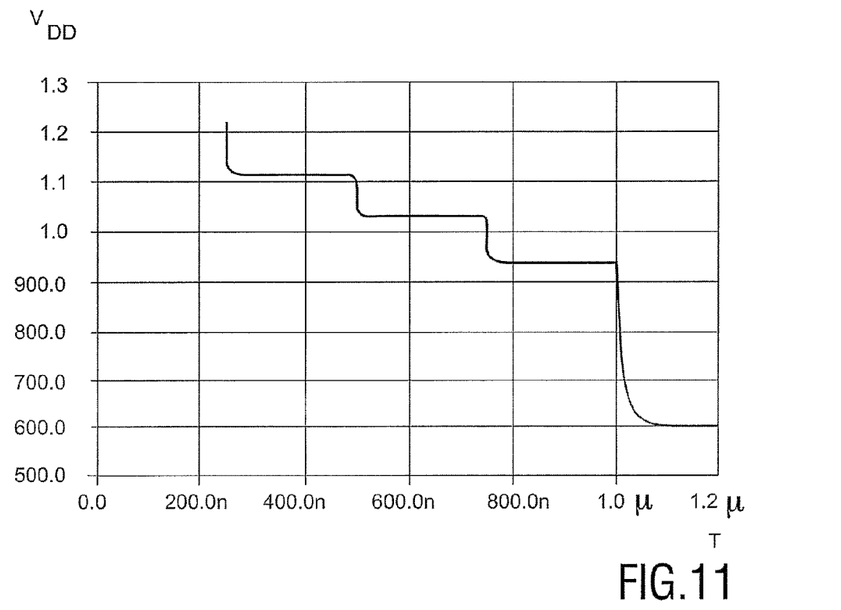
FIG. 11 shows a signaling diagram indicating an example of a supply voltage in the third preferred embodiment.

FIG. 11 shows a signal diagram indicating a waveform of the regulated supply voltage RSP or $V_{DD}$ over time, where a stepwise voltage decrease based on a corresponding change of the content of the shift register 31 can be observed.

Figure 12:
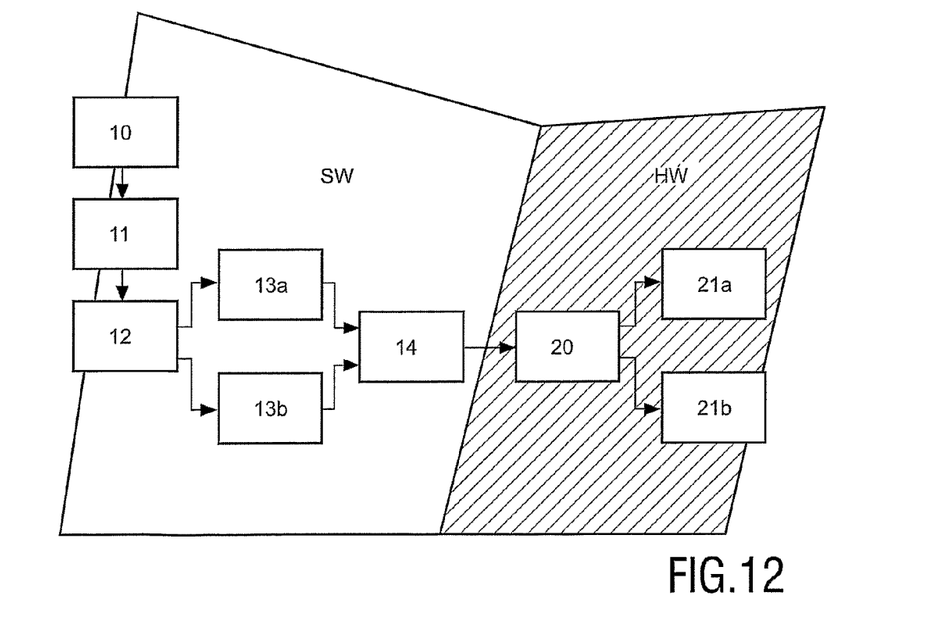
FIG. 12 shows a schematic flow diagram of the control function according to the third preferred embodiment.

FIG. 12 shows a schematic flow diagram indicating processing steps of a proposed control scheme according to the third preferred embodiment, wherein the left portion of FIG. 12 corresponds to a software portion SW of the control scheme and the right portion of FIG. 12 corresponds to a hardware portion HW of the control scheme.

In step 10, the application is normally compiled by a standard compiler. Then in step 11, a standard profiler is used to extract a statistical profile of the application which gives information on the behavior of the application and its performance requirements. Based on the statistic profile obtained in step 11, the performance indicators can be extracted in step 12. Thus, step 12 depends on the hardware that is going to be used. For the proposed solution, this assumption is not necessary and an indicator could only express the performance requirement of a section of the application in comparison with one of the other sections.

In step 13, the indicators or control values UP and DN are extracted in respective partial steps 13a and 13b. This extraction can be done independently from the hardware or tuned to the hardware, e.g. tuned to a specific initial guaranteed performance on which the control signals UP and DN are referenced to. In step 14, the control values UP and DN are embedded in the application as a two-bit or one-bit field for each instruction, for a fixed or variable application section or as a separate program. As already mentioned above, the UP and DN control values may as well be derived from a single binary control value or bit, wherein a first state of the single control bit relates to a high value of the control signal UP and a second state of the control bit relates to a high value of the control signal DN. In step 20 of the hardware section HW, the control values UP and DN are extracted from the application. This extraction depends on step 14. Then, in step 21 the application is executed and the hardware is tuned depending on the control values UP and DN in respective partial steps 21a and 21b.

Next, a fourth preferred embodiment is described, which relates to a control scheme for controlling supply voltage, clock frequency and body-bias of the CMOS circuit 10 of FIG. 1. In particular, the fourth preferred embodiment relates to a very simple autonomous scheme where a performance indicator is supplied and the three physical variables clock frequency, voltage supply and body-bias are modified accordingly and continuously so as to meet the specified performance. One advantage of this fourth preferred embodiment is that the clock frequency is tied to the supply voltage. In other words, scaling the supply voltage $V_{DD}$ up and down results in a corresponding change of the clock frequency. This aspect is important in autonomous islands of performance (AIoP) due to the fact that the speed of the circuit and clock are made to match a proper scaling of the power supply.

From a system standpoint, the AIoP approach aims at developing key circuit design technologies for future IP platforms and assumes that the SoC is composed of islands. Essentially, the AIoP technology provides the hardware infrastructure, referred to as AIoP shell, to adapt the performance of an island or clusters of islands, such that a certain level of performance is guaranteed in terms of both speed and power. The AIoP technology selects the islands optimum power supply and threshold voltage for a given desired performance in terms of speed and/or power consumption.

Figure 13:
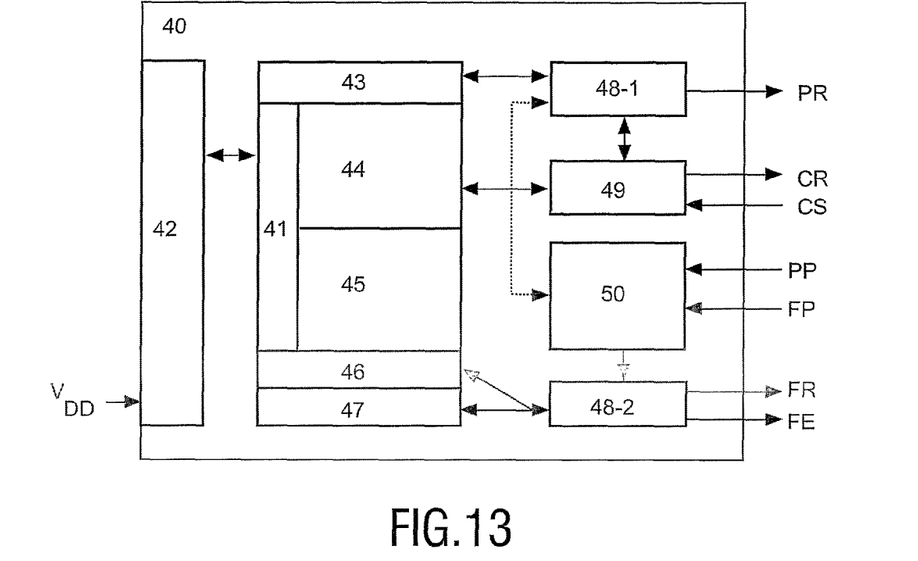
FIG. 13 shows a schematic block diagram of a AIoP shell interface according to a fourth preferred embodiment.

FIG. 13 shows a schematic block diagram of an AIoP shell which input consists of a profile mode and the islands target frequency. The profile mode is an indication for the islands level of activity. Two main profile modes can be distinguished namely an active mode and a standby mode. As set out in a subsequent section each of these main profile modes can be subdivided in subprofiles. A calibration phase is also possible. The shell acknowledges all of the profile, frequency and calibration requests. The frequency (defined by a frequency pointer FP), i.e. the frequency of the clock generated by the clock generating region 41, profile mode (defined by a profile pointer PP) and power supply values $V_{DD}$ are kept in a look-up table (LUT) 50. AIoP controllers 48-1 and 48-2 and a calibration unit 49 make use of the LUT 50 for dynamic tuning of the island under control. Since islands can have distinct power supply voltages, level shifters 42 are needed to communicate with other islands.

The calibration unit 49 is controlled by a calibration start (CS) signal and generates a calibration ready (CR) signal when the calibration has been finished. A threshold controller 48-1 generates a profile ready (PR) signal when the desired profile has been set. The supply controller 48-2 generates a frequency ready (FR) signal when the circuit operates at the desired operating frequency, and a frequency error (FE) signal in case the desired frequency cannot be reached. Furthermore, the AIoP shell which is provided on the island 40 includes a threshold monitoring unit 43 for monitoring the voltage threshold of the controlled circuit, a speed monitoring unit 47 for monitoring the circuit speed, and a PSN monitoring unit 46 for monitoring the power supply noise of the controlled circuit.

Furthermore, the island 40 which may be provided in an isolated third well of a triple well CMOS technology comprises an N-well region 44 and a P-well region 45 in which processing elements of the controlled circuit 10 are arranged, and a clock generating region or functionality 41. These regions are monitored by the threshold monitor 43, the PSN monitor 46 and the speed monitor 47.

The AIoP shell of FIG. 13 offers the possibility of setting the AIoP island 40 in different profile modes. Generally, two profile modes can be distinguished, namely an active mode and a standby mode. In the active mode, the following subprofiles can be selected:

A high performance profile, in which the threshold voltages are brought to a minimum value and the power supply is paired or fixedly related to the required clock frequency.

A typical performance profile, in which threshold voltages are kept at their typical values and the power supply is paired of fixedly related to the required frequency.

A low power performance profile, in which the threshold voltages are brought to the maximum value and the power supply is paired or fixedly related to the required clock frequency.

On the other hand, in the standby mode, the following sub-profiles can be selected:

A cool profile, in which a clock gating is applied, and the power supply is lowered to its minimum allowable value while the threshold voltages are risen to their maximum allowable voltage. This mode or profile can be used for low power purposes.

A cold profile, in which the same settings as in the cool profile are used, but the power supply is cut off from the combinational logic while retaining the circuit state of the flipflops, latches or the like. This mode or profile is suitable for low power low leakage needs.

A cryogenic profile, in which the entire island 40 is simply turned off.

The tuning scheme of the AIoP shell matches power-supply-voltage and clock pairs to a given profile mode which depends on a selection of the threshold voltage. Thus, a change in the power supply voltage is reflected by a change in the clock's frequency and circuit speed. An immediate consequence of this approach is that the frequency spectrum, for the island under consideration, bounds the supply voltage range to upper and lower limits. Due to the fact that power supply and clock are paired, the size of the power supply step determines also the frequency step of the clock.

Figure 14:
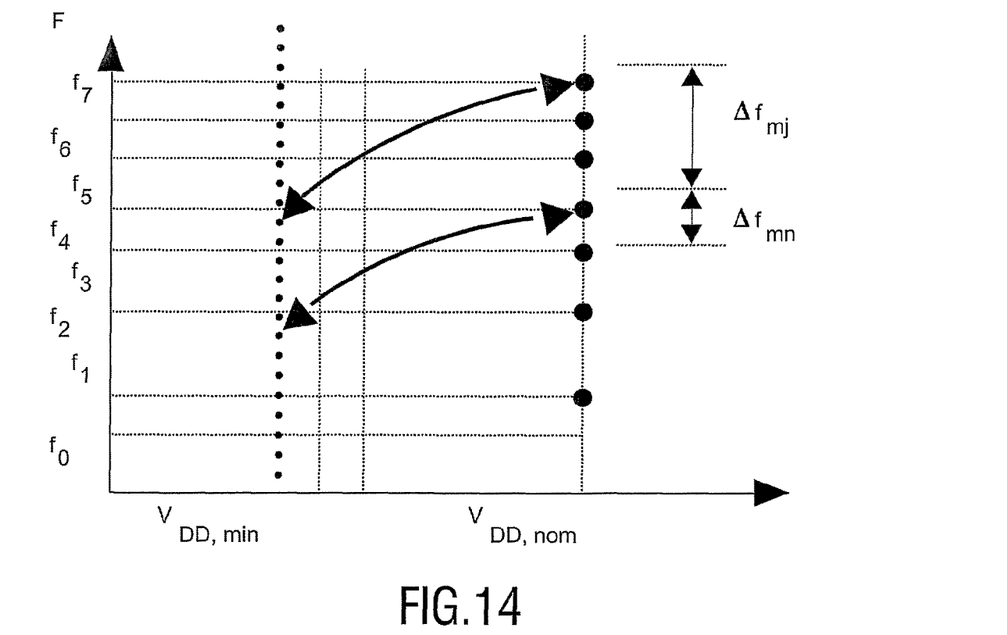
FIG. 14 shows a schematic diagram indicating a clock vs supply voltage pairing according to the fourth preferred embodiment.

FIG. 14 shows a frequency versus voltage diagram indicating a clock and supply voltage pairing used in obtaining programmable clock frequencies according to the fourth preferred embodiment.

The AIoP technology is using a programmable clock that can operate in such a way that frequency can be safely changed discretely, i.e. from any value to any other value, with predictable latency of one clock. This frequency step is referred to as major step $\Delta fmj$. In FIG. 14, the two arrows indicate a tuning relationship between a change of the supply voltage from a minimum supply voltage $V_{DD,min}$ to a nominal supply voltage $V_{DD,nom}$ and the corresponding major step $\Delta_{fmj}$. Once the clock is programmed, minor frequency steps $\Delta_{fmn}$ are obtained by scaling the power supply of the controlled circuit 10, as indicated by the dotted lines, and the clock can be made to match by a proper scaling of the power supply.

It is to be pointed out that the specific features of the above preferred embodiments can be combined or exchanged without departing from the scope of the present invention. E.g. the specific actuator according to the third preferred embodiment may be applied in the first embodiment, and the control schemes of the first and second embodiment may be applied in the fourth preferred embodiments. Any kind of switching arrangement can be used for switching the transistor or resistor elements which form the variable resistors shown in FIG. 1. Moreover, the number of shift registers used in the control scheme of FIG. 4 may vary as long as the two control functions can be combined. The variable-depth control of the pipeline in FIG. 6 can be obtained by other switching and/or control arrangements suitable for bypassing at least one of the registers.

It is further noted that the present invention is not limited to the above preferred embodiments and can be varied within the scope of the attached claims. In particular, the described drawing figures are only schematic and are not limiting. In the drawings, the size of some of the elements may be exaggerated and not drawn on scale for illustrative purposes. Where the term 'comprising' is used in the present description and claims, it does not exclude other elements or steps. Where an indefinite or definite article is used when referring to a singular noun, e.g. 'a' or 'an', 'the', this includes a plural of that noun unless something else is specifically stated. The terms first, second, third and the like in the description and in the claims are used for distinguishing between similar elements and not necessarily for describing a sequential or chronological order. It is to be understood that the embodiments of the invention described herein are capable of operation in other sequences than described or illustrated herein. Moreover, although preferred embodiments, specific constructions and configurations have been discussed herein, various changes or modifications in form and detail may be made without departing from the scope of the attached claims.

The invention claimed is:

1. A circuit arrangement for controlling power supply in an integrated circuit partitioned into different islands, the circuit arrangement comprising:
   a) a variable resistor device configured to individually adjust a power supply of a plurality of electrically isolated circuits provided on the islands; and
   b) a monitoring device configured to monitor at least one working parameter of the plurality of the electrically isolated circuit;
   c) a local control device configured to independently control the power supply for each of the plurality of electrically isolated circuits based on the at least one monitored working parameter of the plurality of electrically isolated circuits;
   d) wherein the local control device is configured to supply a control signal to the variable resistor device so as to control the conductivity of the variable resistor device.

2. A circuit arrangement according to claim 1, wherein the variable resistor device comprises at least one transistor connected in series between the isolated circuits and at least one power supply terminal.

3. A circuit arrangement according to claim 2, wherein the at least one transistor comprise a first transistor connected between a first power supply input of a dedicated one of the isolated circuits and a first one of the power supply terminals, and a second transistor connected between a second power supply input of the dedicated one of the isolated circuits and a second one of the power supply terminals, wherein the local control device is configured to supply a first control signal to the first transistor and a second control signal to the second transistor, and wherein the first control signal is an inversion of the second control signal.

4. A circuit arrangement according to claim 2, wherein the at least one transistor is divided into a plurality of transistor segments, each segment or subset of segments being connected to a bit of a dedicated control register which is set by the local control device.

5. A circuit arrangement according to claim 1, wherein the local control device comprises a first control function for compensating average voltage fluctuations, and a second control function for compensating voltage fluctuations due to activity changes of a dedicated one of the plurality of electrically isolated circuits.

6. A circuit arrangement according to claim 5, wherein the first control function is used for controlling a clock frequency of the dedicated one of the plurality of electrically isolated circuits.

7. A circuit arrangement according to claim 5, wherein the first and second control functions are configured to set control values into respective first and second shift registers the first and second shift registers being used to control the variable resistor device.

8. A circuit arrangement according to claim 5, further comprising arbitration unit for selectively connecting the first and second control functions to the first and second shift registers.

9. A circuit arrangement according to claim 5, further comprising a look-up table for storing a desired value for the first control function.

10. A circuit arrangement according to claim 1, wherein the local control device is configured to control the conductivity by performing at least one of changing the voltage level of the control signal and switching the control signal.

11. A circuit arrangement according to claim 1, wherein the control signal is used to dynamically change an element size of the variable resistor device.

12. A circuit arrangement according to claim 1, wherein the adjusted power supply is forwarded to a clock generating unit to individually adjust a clock supplied to the plurality of electrically isolated circuits.

13. A circuit arrangement according to claim 1, wherein the local control device is configured to control a back-bias voltage of transistor elements provided in the plurality of isolated circuits.

14. A circuit arrangement according to claim 1, wherein the local control device is configured to control a bypass unit to skip at least one register of a processing pipeline of the plurality of isolated circuits.

15. A circuit arrangement according to a claim 1, further comprising a shift register connected to the variable resistor device and to a clock generator unit configured to supply an adjusted clock signal to the isolated circuits, wherein the shift register is controlled based on a binary control signal supplied from the local control device and wherein the binary control signal defines a binary value shifted into the shift register so as to either increase or decrease the performance of the isolated circuits.

16. A circuit arrangement according to claim 15, wherein bit values of the shift register are used to individually bypass delay sections of the clock generator unit.

17. A circuit arrangement according to claim 1, wherein the local control device is configured to select a predetermined profile mode from a plurality of profile modes, each profile mode defining a predetermined relationship between a set of performance parameters of the isolated circuits.

18. A circuit arrangement according to claim 17, wherein the performance parameters comprise a clock frequency, a power supply voltage and a threshold voltage.

19. A circuit arrangement according to claim 17, wherein the predetermined profile mode and the performance parameters are stored in a look-up table.

20. A circuit arrangement according to claim 17, wherein the plurality of profile modes comprise a profile mode in which the power supply voltage and the clock frequency are maintained at a fixed relationship.

21. A method of controlling power supply in an integrated circuit partitioned into different islands, the method comprising the steps of:
   a) monitoring at least one working parameter of a plurality of electrically isolated circuits provided on the islands; and
   b) locally controlling conductivity of variable resistor device so as to individually adjust power supply for each of the plurality of electrically isolated circuits based on the at least one monitored working parameter.

* * * * *